United States Patent
Smith et al.

(10) Patent No.: US 10,320,892 B2
(45) Date of Patent: Jun. 11, 2019

(54) ROLLING CAPACITY UPGRADE CONTROL

(71) Applicant: Microsoft Technology Licensing, LLC, Redmond, WA (US)

(72) Inventors: Bradley S. Smith, Sammamish, WA (US); Kalyan K. Kona, Sammamish, WA (US); Sundaravadivelan Paranthaman, Samamish, WA (US); Ankur Jauhari, Bothell, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 523 days.

(21) Appl. No.: 14/588,653

(22) Filed: Jan. 2, 2015

(65) Prior Publication Data
US 2016/0197844 A1    Jul. 7, 2016

(51) Int. Cl.
| H04L 29/08 | (2006.01) |
| G06F 3/06 | (2006.01) |
| G06F 9/50 | (2006.01) |
| H04L 12/24 | (2006.01) |

(52) U.S. Cl.
CPC .......... *H04L 67/1004* (2013.01); *G06F 3/067* (2013.01); *G06F 9/50* (2013.01); *H04L 41/0896* (2013.01); *H04L 41/5041* (2013.01); *H04L 67/1097* (2013.01); *H04L 41/5096* (2013.01)

(58) Field of Classification Search
CPC .... G06F 8/65; G06F 11/1433; G06F 11/2033; G06F 17/30578; G06F 2201/80; G06F 8/68; G06F 9/45558; G06F 9/5077; G06F 9/5088; H04L 67/1095
See application file for complete search history.

(56) References Cited

U.S. PATENT DOCUMENTS

| 7,552,171 | B2 | 6/2009 | Chidambaran et al. |
| 7,657,887 | B2 | 2/2010 | Kothandaraman et al. |
| 8,181,071 | B2 | 5/2012 | Cahill et al. |
| 8,296,267 | B2 | 10/2012 | Cahill et al. |
| 8,370,828 | B2 | 2/2013 | Bankston et al. |
| 8,631,411 | B1 * | 1/2014 | Ghose .................. G06F 1/3206 718/102 |

(Continued)

OTHER PUBLICATIONS

Verma, et al., "The Cost of Reconfiguration in a Cloud", In Proceedings of the 11th International Middleware Conference Industrial Track, Nov. 29, 2010, 6 pages.

(Continued)

*Primary Examiner* — Edward Kim
(74) *Attorney, Agent, or Firm* — Christopher J. Volkmann; Kelly, Holt & Christenson, PLLC (57) ABSTRACT

In order to upgrade a source farm to a target farm, the target farm is created with an initial increment of resource capacity that is a fraction of a final resource capacity of the target farm. A corresponding increment of the databases attached to the source farm are then switched from the source farm to the target farm. The resource capacity at the source farm, that was used to service the moved databases, is then removed from the source farm and added to the target farm, and another increment of the databases are switched from the source farm to the target farm. This continues until a full capacity of resources is deployed at the target farm, and the databases are fully moved from the source farm to the target farm.

20 Claims, 7 Drawing Sheets

(56) References Cited

U.S. PATENT DOCUMENTS

| | | | |
|---|---|---|---|
| 2002/0069084 A1* | 6/2002 | Donovan | G06Q 50/265 |
| | | | 705/325 |
| 2004/0088361 A1* | 5/2004 | Statman | G06F 9/546 |
| | | | 709/206 |
| 2005/0021690 A1* | 1/2005 | Peddada | G06F 9/5055 |
| | | | 709/220 |
| 2005/0149582 A1* | 7/2005 | Wissmann | G06F 16/275 |
| 2007/0050431 A1 | 3/2007 | Vaidya et al. | |
| 2009/0007106 A1* | 1/2009 | Araujo, Jr. | G06F 9/54 |
| | | | 718/1 |
| 2009/0222806 A1 | 9/2009 | Faus et al. | |
| 2011/0179162 A1 | 7/2011 | Mayo et al. | |
| 2011/0231698 A1* | 9/2011 | Zlati | G06F 11/3006 |
| | | | 714/3 |
| 2012/0144008 A1 | 6/2012 | Yuyitung et al. | |
| 2012/0311376 A1 | 12/2012 | Taranov et al. | |
| 2013/0326546 A1* | 12/2013 | Bavishi | G06F 16/214 |
| | | | 719/328 |
| 2014/0082625 A1* | 3/2014 | Busaba | G06F 9/38 |
| | | | 718/104 |
| 2016/0117180 A1* | 4/2016 | Cardonha | G06F 9/44505 |
| | | | 713/100 |

OTHER PUBLICATIONS

"Maximize Availability with Oracle Database 12c", In Oracle white Paper, Sep. 2014, 28 pages.

Jing, et al., "Orpg Review: Clustering, Database and System Management", Retrieved on: Oct. 28, 2011, Available at: https://ams.confex.com/ams/pdfpapers/54934.pdf?origin=publication_detail.

Devlin, et al., "Scalability Terminology: Farms, Clones, Partitions, and Packs: RACS and RAP", In Technical Report MS-TR-99-85, Dec. 1999,10 pages.

"Content deployment overview (SharePoint Server 2010)", Retrieved on : Oct. 28, 2014, Available at: http://technet.microsoft.com/en-in/library/ee721058%28v=office.14%29.aspx.

"Technical Guide for Upgrading/Migrating to Xenapp™ 6.5". Published on: Aug. 24, 2008 Available at: http://support.citrix.com/servlet/KbServlet/download/28732-102-671615/.

\* cited by examiner

ROLLING CAPACITY UPGRADE CONTROL

BACKGROUND

Computer systems are currently in wide use. Some such computer systems are used to host services in a cloud deployment.

There are a wide variety of different types of computer systems that host services in a cloud deployment. Some examples include, for instance, document management computing systems that allow users to manage documents using a cloud service. Still other computing systems include electronic mail computing systems, computing systems that implement development environments, social network computing systems, among a wide variety of others.

It is not uncommon for the computing systems to be intermittently upgraded. For instance, the computing system manufacturer may release an upgraded build. In these types of situations, organizations that use the computing system may wish to upgrade to the new build. There are a wide variety of other types of upgrades that can be performed, and which users may wish to take advantage of.

In multi-tenant deployments, the cloud-based computing system often includes a plurality of different servers. The servers may include a plurality of different hardware computing systems that implement a plurality of different virtual machines. The virtual machines can include web servers that perform front end processing to accommodate service interactions by the various tenants, with the computing system. The virtual machines can also include back end servers that perform back end processing, such as processing against a database, or other types of back end processing. As but one example, it may be that such a computing system uses 40-200 different virtual machine servers which are deployed on a large number of hardware machines. A group of servers that serve a group of tenants is often referred to as a server farm.

Currently, when upgrades are made, a target server farm is created. The target server farm is created with at least the same capacity (in terms of hardware machines and virtual machines) as a source server farm that is to be upgraded to the target server farm. Once the entire target farm is created, then the databases are disconnected from the source farm and are reconnected to the target farm.

The discussion above is merely provided for general background information and is not intended to be used as an aid in determining the scope of the claimed subject matter.

SUMMARY

In order to upgrade a source farm to a target farm, the target farm is created with an initial increment of resource capacity that is a fraction of a final resource capacity of the target farm. A corresponding increment of the databases attached to the source farm are then switched from the source farm to the target farm. The resource capacity at the source farm, that was used to service the moved databases, is then removed from the source farm and added to the target farm, and another increment of the databases is switched from the source farm to the target farm. This continues until a full capacity of resources is deployed at the target farm, and the databases are fully moved from the source farm to the target farm.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
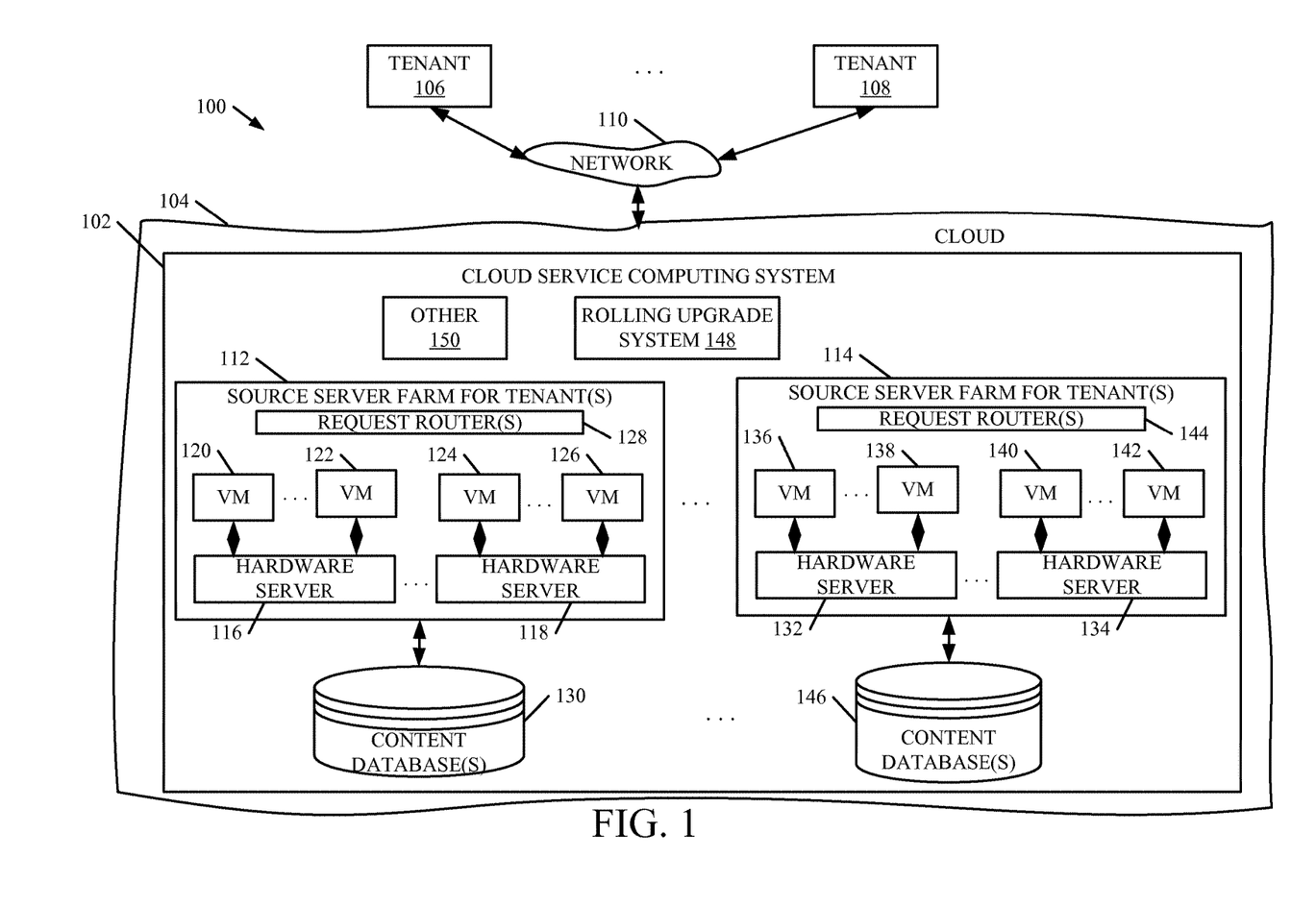
FIG. 1 is a block diagram of one example of a multi-tenant cloud service architecture.

FIG. 1 is a block diagram of one example of a multi-tenant cloud service architecture 100. Architecture 100 includes cloud service computing system 102 deployed in cloud 104. System 102 illustratively hosts a service that is accessed by multiple different tenants 106-108, over network 110. Each tenant 106-108 illustratively corresponds to a separate organization. Each organization can have its own data that is separated from the data of other tenants. Computing system 102 can also illustratively provide different instances of the service, for each tenant, or the tenants can share services.

In the example shown in FIG. 1, computing system 102 illustratively includes server farms 112-114. Each server farm illustratively services requests from one or more different tenants 106-108. Server farm 112 illustratively includes a set of hardware servers 116-118, each of which deploy one or more different virtual machines 120-122 and 124-126, respectively. Requests from tenants 106-108 (which are served by server farm 112) are received by one or more request routers 128, and routed to a virtual machine, for servicing. Server farm 112 illustratively has access to one or more content databases 130 that store the data for the various tenants served by server farm 112.

Server farm 114 illustratively includes a set of hardware server machines 132-134, each of which implement one or more different virtual machines 136-138 and 140-142, respectively. Requests from the various tenants 106-108 that are served by server farm 114, are illustratively received by one or more request routers 144, where they are routed to a desired virtual machine, for servicing. Server farm 114 illustratively has access to one or more content databases 146 which store the data for the various tenants 106-108 that are served by server farm 114.

In the example shown in FIG. 1, cloud service computing system 102 also illustratively includes upgrade system 148 that performs upgrades, as is described in greater detail below. It can also include other items 150, as well.

Figure 2:
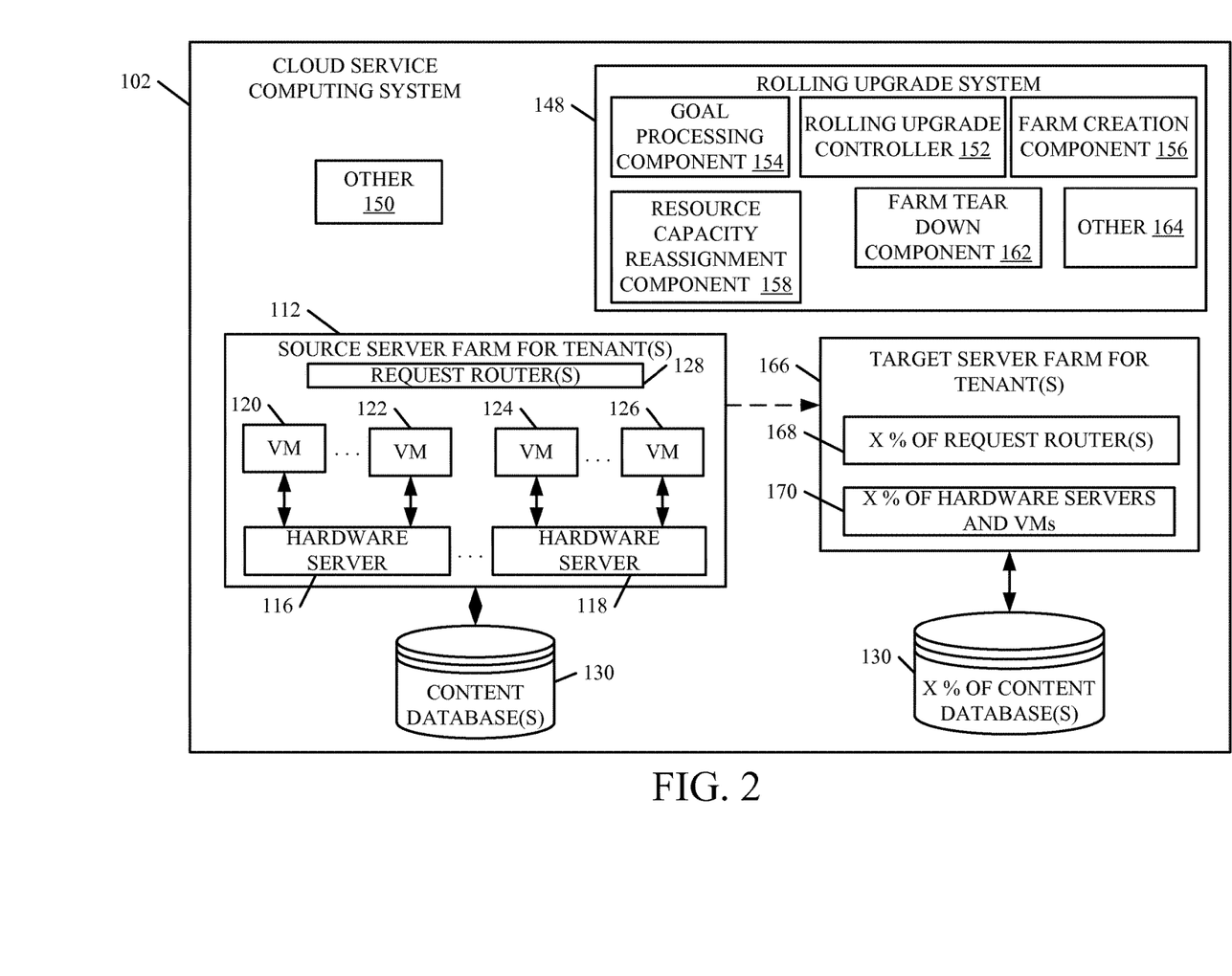
FIG. 2 is a block diagram of a cloud service (shown in FIG. 1) in more detail, during an upgrade process.

FIG. 2 is a block diagram of one example of a portion of cloud service computing system 102, during an upgrade process. FIG. 2 also illustrates one example of rolling upgrade system 148, in more detail.

Before describing the operation of rolling upgrade system 148 in more detail (which is described below with respect to FIGS. 3A-4), an overview will be provided with respect to FIG. 2. It can be seen in FIG. 2 that rolling upgrade system 148 illustratively includes rolling upgrade controller 152, goal processing component 154, farm creation component 156, resource capacity reassignment component 158, database move component 160, and farm tear down component 162. It can include other items 164 as well.

Rolling upgrade controller 152 illustratively controls rolling upgrade system 148 to perform an incremental (or rolling) upgrade of a source server farm. (in this example server farm 112) to a target server farm, in this case server farm 166. Goal processing component 154 illustratively receives capacity goals for source server farm 112 and target server farm 166 and controls the deployment of virtual machines in order to meet the capacity goals. While component 154 is shown as a single component there can be a separate goal processing component for each farm as well. Farm creation component 156 illustratively creates target server farm 166 in response to a request to upgrade source server farm 112. Resource capacity reassignment component 158 illustratively reassigns computing resources (e.g., hardware servers and virtual machines) from source server farm 112 to target server farm 166, in an incremental (or rolling) way. Database move component 160 illustratively moves content databases 130, from source server farm 112 to target server farm 166, as the resource capacity is available at target server farm 166, to handle those databases. Farm teardown component 162 illustratively tears down the remainder of source server farm 112 (such as discontinuing deployment of final virtual machines) after the upgrade has been completed, and all databases are moved to target server farm 166.

FIG. 2 also shows that, during each upgrade operation, rolling upgrade system 148 incrementally moves a given increment (e.g, a given fraction or percent) of the resource capacity of source server farm 112 to target server farm 166, and then moves a portion of databases 130, once the resource capacity at target server farm 166 is available to handle them. The given increment of computing resource capacity that is moved from source server farm 112 to target server farm 166 can be determined in a number of different ways.

In one example, source server farm 112 includes a plurality of request routers 128. Each request router 128 handles requests from a given set of tenants. Rolling upgrade system 148 can move a given percent of the capacity of source server farm 112, corresponding to the percent of tenants served by each of the different request routers. For instance, if source server farm 112 includes five request routers then rolling upgrade system 148 can move a single request router at a time. It can also reassign one fifth the computing resource capacity (e.g., the hardware servers 116-118 and virtual machines 120-126) from source server farm 112 to target server farm 166. It can then move one fifth of the databases from source server farm 112 to target server farm 166. When that upgrade has been completed, then rolling upgrade system 148 can move another request router from source server farm 112 to target server farm 116, and it can reassign another corresponding fractional part (e.g, one fifth) of the computing resource capacity from the source farm 112 to the target farm 166. This can continue until all of the desired computing resource capacity has been reassigned from source server farm 112 to target server farm 116, and until all of the corresponding databases 130 have been moved from source server farm 112 to target server farm 166.

Therefore, in the example shown in FIG. 2, the request routers in target server farm 166 are represented by x percent of the request routers 168, and the hardware servers and virtual machines in target server farm 166 are represented by x percent of the hardware servers and virtual machines 170. This indicates that, during the upgrade process, only a given increment (e.g, a given percent or fractional part) of the request routers and computing resource capacity (e.g., hardware servers and virtual machines) will be moved from source server farm 112 to target server farm 166, at any given time. The corresponding increment of the content databases 130 can be moved once the computing resource capacity is available at target server farm 166 to handle them.

Figure 3A:
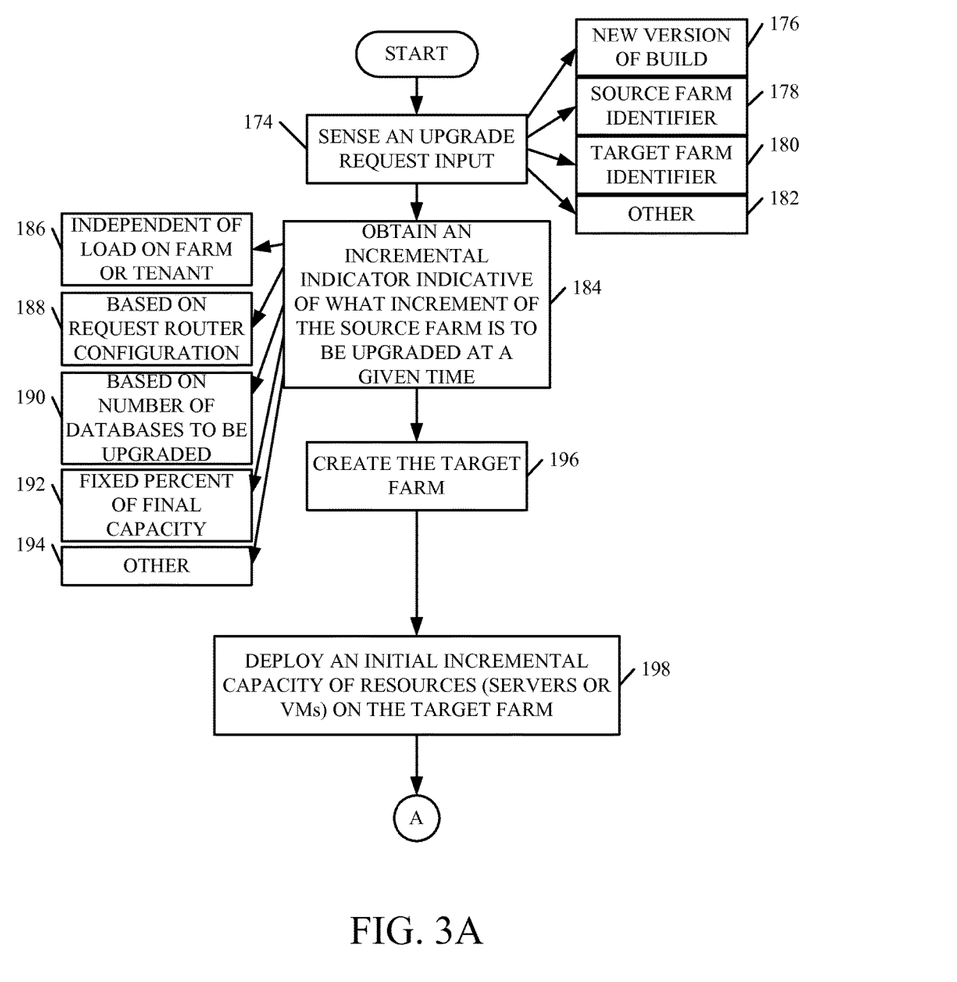
FIGS. 3A and 3B (collectively referred to herein as FIG. 3) illustrate a flow diagram showing one example of the operation of the cloud service (shown in FIG. 2) in performing a capacity upgrade.
Figure 3B:
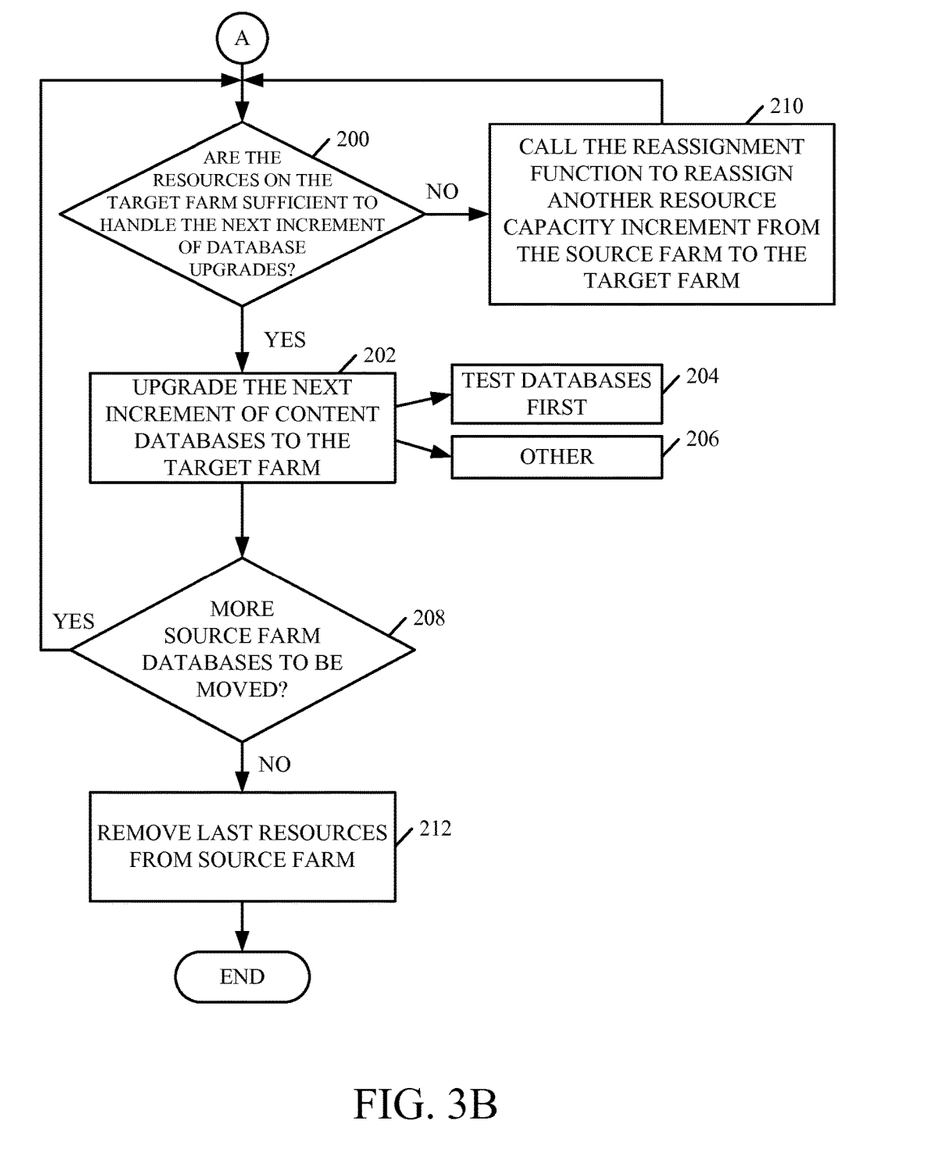

FIGS. 3A and 3B (collectively referred to herein as FIG. 3) show a flow diagram illustrating one example of the operation of cloud service computing system 102, in performing a rolling upgrade of source server farm 112 to target server farm 166. At some point, rolling upgrade system 148 senses an upgrade request input. This is indicated by block 174. The upgrade request input can be received from a variety of different systems. For instance, it may be that cloud service computing system 102 has implemented a new version of a build of the service that it is hosting. That may result in an upgrade request by an administrator. This is indicated by block 176. The upgrade request may include a source farm identifier 178 and a target farm identifier 180. These identifiers serve to identify the source server farm 112 and the target server farm 166 to which the source farm is to be upgraded. The upgrade request input can be received in other ways, and it can include other information as well. This is indicated by block 182.

Rolling upgrade controller 152 then obtains an incremental indicator that indicates what increment of the source server farm is to be upgraded at a given time. This is indicated by block 184. In one example, the incremental indicator simply indicates a given percentage of the computing resources (and corresponding databases) that are to be moved from source server farm 112 to target server farm 114, with each upgrade phase or operation. This can be a fixed percentage, or one that is set by an administrator or other person. In one example, the increment is independent of a processing load on either source server farm 112, or on any given tenant. This is indicated by block 186. That is, the upgrade system 148 performs the upgrade independently of load balancing operations that may also be performed by cloud computing system 102.

In one example, the incremental indicator is set based on the particular request router configuration of the source server farm 112. For instance, if there are multiple different request routers 128 on source server farm 112, the incremental indicator may correspond to a subset of those request routers. As briefly mentioned above, assume that there are five request routers in source farm 112. In that case, upgrade system 148 may choose to move the computing resources corresponding to a single request router, at a time. Therefore, in the example where there are five request routers, upgrade system 148 illustratively reassigns one request router and 20% of the computing resources of source server farm 112 to target server farm 166, with each upgrade operation (or phase). Selecting the increment of the source server farm resource capacity to move with each upgrade operation based on the request router configuration is indicated by block 188 in FIG. 3.

In another example, the increment of the computing resources of source server farm 112 that are to be moved to target server farm 166 with each upgrade operation is determined based upon a number of databases 130 that are serviced by source server farm 112. For instance, the increment can be obtained by dividing the number of databases by a given denominator. Basing the increment of resource capacity to move at one time on the number of databases is indicated by block 190 in FIG. 3.

In yet another example, the increment to be reassigned with each upgrade operation may be a fixed percent of the final resource capacity of target farm 166. This is indicated by block 192. Of course, it will be noted that the increment can be obtained using a combination of those factors mentioned above, or in other ways, as indicated by block 194.

Once rolling upgrade controller 156 obtains the incremental indicator, so that it knows how much of source server farm 112 is to be moved to target server farm 166 with each upgrade operation, farm creation component 156 then creates target farm 166. This is indicated by block 196. In one example, it creates target farm 166 without deploying any virtual machines. This is an example only.

Farm creation component 156 then deploys an initial incremental capacity of the resources (e.g., servers or VMs or both) on the target farm 166. This is indicated by block 198. For instance, in one example, farm creation component 156 sets a capacity goal for target farm 166 of a certain percent of the resources to be deployed there. In keeping with the example discussed above, it may set the goal for target farm 166 of 20% of its final capacity. In that case, goal processing component 154 deploys virtual machines 120-126 on target farm 166 until the capacity goal is met. Deploying an initial incremental capacity of resources on the target farm 166 can be done in other ways as well.

Database move component 160 then determines whether the resource capacity of target farm 166 is sufficient to handle an incremental level of databases. This is indicated by block 200. For instance, if database move component 160 is about to move 20% of the content databases 130 from source farm 112 to target farm 166, it determines whether target farm 166 has a sufficient amount of computing resource capacity deployed thereon in order to service the 20% of the content databases that are about to be moved. If so, database move component 160 moves (or upgrades) that incremental amount of content databases 130 from source farm 112 to target farm 166. This is indicated by block 202.

In one example, database move component 160 first moves test databases and tests their operation, to ensure that they are properly moved. It then moves the actual databases. This is indicated by block 204. Database move component 160 can move databases in other ways as well, and this is indicated by block 206.

Rolling upgrade controller 152 then determines whether there are any more source farm databases 130 to be moved to target farm 166. This is indicated by block 208. If so, processing reverts to block 200 where resource capacity reassignment component 158 determines whether the resources on target farm 166 are sufficient to service the next increment of databases that are to be moved. If not, then resource capacity reassignment component calls or executes a reassignment function that reassigns another capacity increment of computing resources (e.g., another portion of the request routers, server hardware and virtual machines) from source farm 112 to target farm 166. This is indicated by block 210 in FIG. 3.

Rolling upgrade system 148 repeats the processing performed in blocks 200-210 until it has moved all of the content databases 130 from source farm 130 to target farm 166. In doing so, it moves the databases incrementally. Therefore, the processing load on source farm 112 will decrease as the processing load on target farm 166 increases. System 148 thus reassigns the computing resources from source farm 112 to target farm 166 in a rolling, or incremental, way. Thus, upgrade system 148 does not need to deploy a full target farm 166 with its full, final resource capacity, at the outset of the upgrade operation. Instead, it only needs to deploy a single, incremental resource capacity in target farm 166, and then move an incremental amount of the content databases 130. Once those databases are removed from source farm 112, then that same increment of processing resources (e.g., request routers 128, hardware servers 116 and virtual machines 120-126) is no longer needed at source farm 112, and it can be reassigned from source farm 112 to target farm 166. Once the processing capacity (or resource capacity) has been added to target farm 166, another incremental amount of content databases 130 can be moved from source farm 112 to target farm 166. In this way, upgrade system 148 need not create a large target farm capacity, until that target farm capacity is ready to be utilized. Instead of (as in past upgrade systems), deploying a full capacity target farm prior to moving any databases (which results in the need for two full capacity server farms—both the source and target server farms—one of which is unused), the upgrade system needs only a single increment of resource capacity to be available, and unused, a the target farm prior to transferring the next increment of databases. This results in a large savings in terms of hardware servers and deployed virtual machines, that are needed to perform an upgrade of a source farm to a target farm.

Returning again to block 208 in FIG. 3, it will be seen that once the final incremental amount of content databases 130 are moved from source farm 112 to target farm 166, there will still be a single incremental amount of resource capacity existing in source farm 112. For instance (and continuing with the above example), if upgrade system 148 moves the final 20% of the content databases 130 from source farm 112 to target farm 166, then source farm 112 will still have 20% of its computing resource capacity (e.g., hardware servers and virtual machines) deployed. Thus, farm teardown component 162 illustratively removes the last computing resources from allocation to source farm 112. It can, for example, shut down the virtual machines and provide an indication that the hardware servers are no longer being used by source farm 112. Removing the last resources from source farm 112 is indicated by block 212 in FIG. 3.

Figure 4:
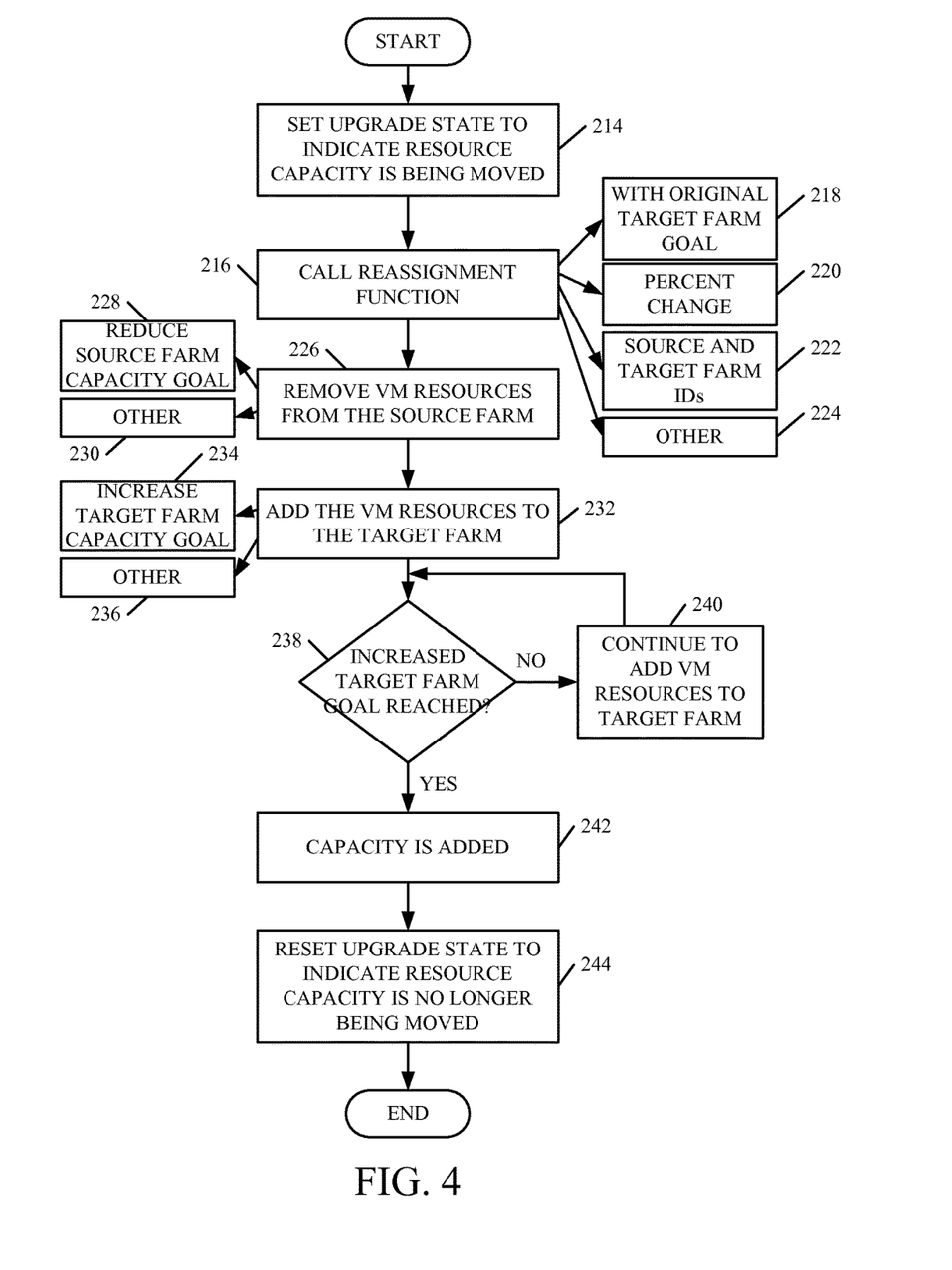
FIG. 4 is a flow diagram illustrating one, more detailed, example of the operation of an upgrade system (shown in FIGS. 1 and 2) in performing an upgrade.

FIG. 4 is a flow diagram illustrating one example of the operation of rolling upgrade system 148, in reassigning resource capacity from source farm 112 to target farm 166, in more detail. It is first assumed that rolling upgrade system 148 has determined that the resource capacity on target farm 166 must be increased in order to accommodate the assignment of a next increment of content databases 130 from source farm 112. Rolling upgrade system 148 can also maintain an upgrade state for each farm it is upgrading that reflects the state of the upgrade being performed (in this case, the state of the upgrade of source farm 112 to target farm 166). Rolling upgrade controller 152 can then set the upgrade state to indicate that resource capacity is being moved from source farm 112 to target farm 166. Setting the upgrade state to show this is indicated by block 214 in FIG. 4.

Rolling upgrade controller 152 then illustratively calls the reassignment function on resource capacity reassignment component 158. This is indicated by block 216. In doing so, it can provide arguments with the function call. The arguments can, for instance, include an original target farm goal 218. This can be used to adjust the goal of the source farm downward and to ensure that the target farm's goal does not exceed this value. The function call can also include an argument that indicates a percent change in resources. This is the amount by which the resource capacity needs to be reassigned from source farm 112 to target farm 166. The percent change argument is indicated by block 220. The function call can also provide, as arguments, the source and target farm identifiers that identify the particular source farm 112 and target farm 166 where the reassignment of resources is to take place. This is indicated by block 222. Calling the reassignment function can include other items as well, and this is indicated by block 224.

Once the reassignment function has been called, resource capacity reassignment component 158 removes the virtual machine resources (and hardware server resources), corresponding to the incremental capacity to be moved, from source farm 112. This is indicated by block 226. It can do this by reducing the source farm capacity goal so that goal processing component 154 reduces the number of virtual machines deployed at source farm 112, in order to meet the newly reduced goal. This is indicated by block 228. Component 158 can remove the resources from source farm 112 in other ways as well, and this is indicated by block 230.

Component 158 then adds the resource capacity that was just removed from source farm 112 to target farm 166. This is indicated by block 232. It can do this in a variety of different ways as well. For instance, it can increase the target farm capacity goal, as indicated by block 234. In this way, goal processing component 154 will add virtual machines to target farm 166 until the resource capacity goal is met. Component 158 can add the resources to target farm 166 in other ways as well, and this is indicated by block 236.

Component 158 continues to remove resources from source farm 112 and add them to target farm 166 until the target farm goal is reached. This is indicated by blocks 238 and 240. Once the goal is reached, rolling upgrade controller 152 determines that the incremental capacity has now been added to target farm 166. This is indicated by block 242. It can then reset the upgrade state to indicate that the resource capacity is no longer being moved. This is indicated by block 244.

It can thus be seen that rolling upgrade system 148, in performing the rolling upgrade operations, can dramatically reduce the need for upgrade capacity by advantageously creating a small target farm for upgrade, and then moving hardware from the source farm to the target farm as tenants are upgraded from the source farm to the target farm, incrementally. This can accomplish up to a 70-80 percent reduction in hardware requirements for performing such an upgrade. This is because it enables the target farm to use capacity from the source farm, as that capacity is no longer needed at the source farm. The target farm can be deployed initially with a relatively small amount of capacity. The capacity is then rolled in incremental batches. The increment can be a fixed increment, it can be based on the number of request routers, it can be based on the number of databases to be moved, or it can be set in other ways. This system can be used to ensure that the source and target farms only have the minimum capacity deployed that is needed to perform the upgrade operations. In addition, because the state of the upgrade operation can be maintained by rolling upgrade controller 152, even if the upgrade operation is interrupted, it can be re-entered and continued from the point where it was interrupted.

It should also be noted that rolling upgrade system 148 can be used in other scenarios as well. For instance, where an upgrade has been performed, or partially performed, it may be that problems occur and it is decided to roll the upgrade back from the target farm to the source farm. Rolling upgrade system 148 can use the same process in reassigning resources (and then moving databases) from the target farm to the source farm in order to roll back the upgrade operation. Similarly, even though a full upgrade from a source farm to a target farm is not being performed, rolling upgrade system 148 can be used to reassign capacity from any other farm (such as one where there is little traffic and portions of the hardware are idle) to another farm. Again, when performing the reassignment operation, the reassignment is performed as a given percentage of the resource capacity, and is independent of load on the farms involved.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
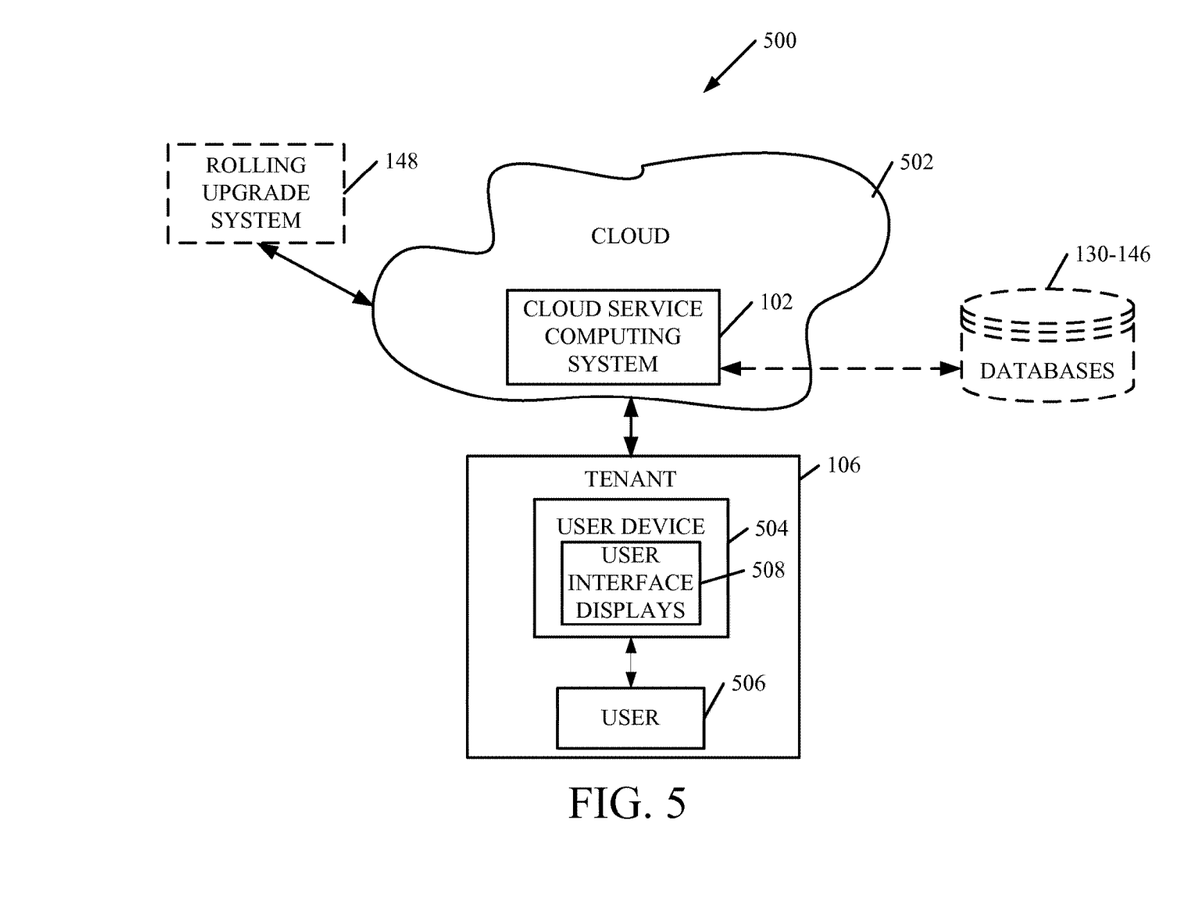
FIG. 5 is a block diagram of the architecture shown in FIG. 1, deployed in another cloud computing architecture.

FIG. 5 is a block diagram of architecture 100, shown in FIG. 1, except that its elements are disposed in another cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that cloud service computing system 102 is located in cloud 502 (which can be public, private, or a combination where portions are public while others are private). Therefore, user 506 uses a user device 504 (and user interface displays 508) that includes tenant 106 to access those systems through cloud 502.

FIG. 5 also depicts another example of a cloud architecture. FIG. 5 shows that it is also contemplated that some elements of system 102 can be disposed in cloud 502 while others are not. By way of example, data stores 130-146 can be disposed outside of cloud 502, and accessed through cloud 502. In another example, rolling upgrade system 148 is also outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
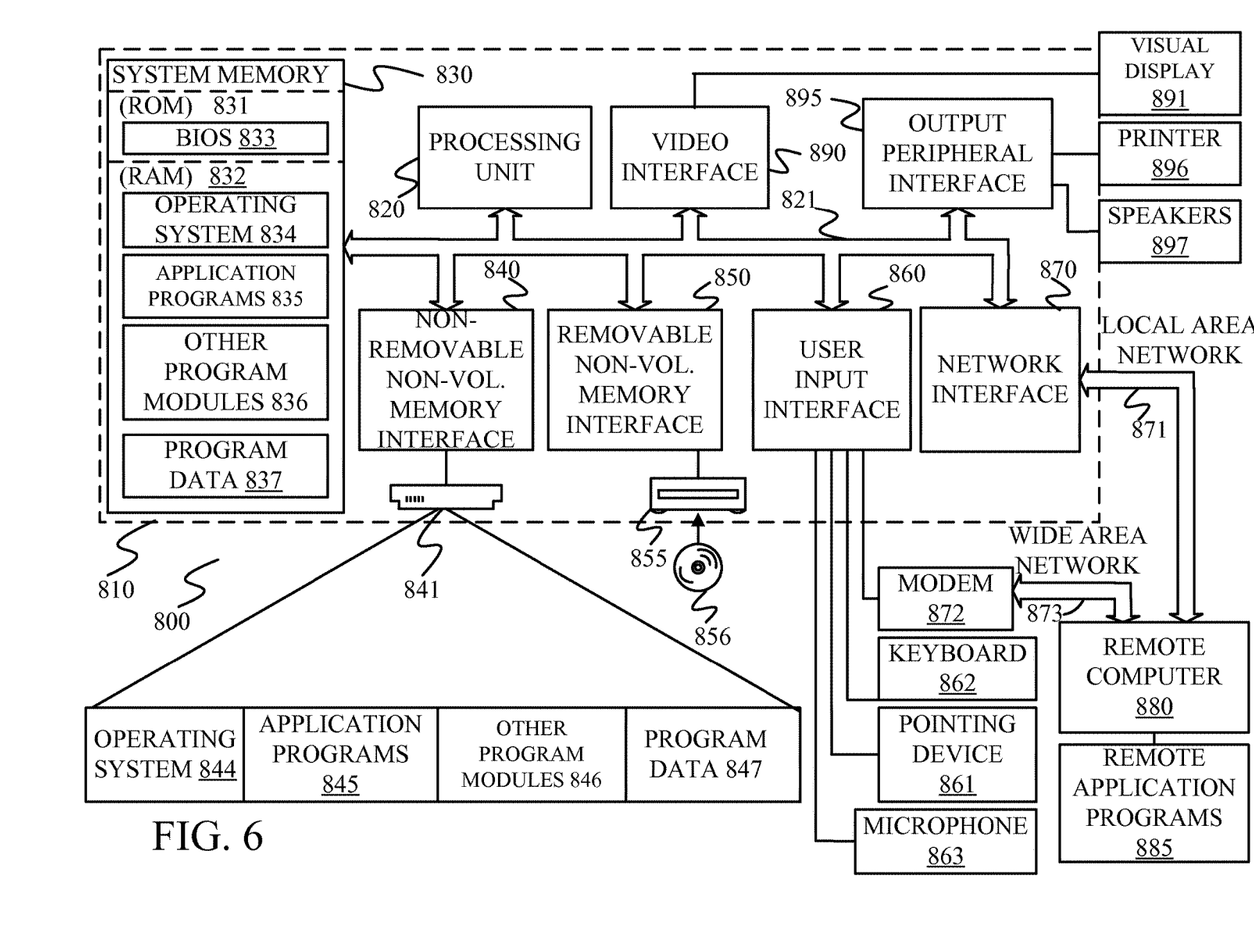
FIG. 6 is a block diagram of one example of a computing environment that can be used in any of the architectures shown in the previous figures.

FIG. 6 is one example of a computing environment in which architecture 100, or parts of it, (for example) can be deployed. With reference to FIG. 6, an example system for implementing some embodiments includes a general-purpose computing device in the form of a computer 810. Components of computer 810 may include, but are not limited to, a processing unit 820 (which can comprise processors or servers in system 102), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIGS. 1 and 2 can be deployed in corresponding portions of FIG. 6.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 6 illustrates operating system 834, application programs 835, other program modules 836, and program data 837.

The computer 810 may also include other removable/non-removable volatile/nonvolatile computer storage media. By way of example only, FIG. 6 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 6, provide storage of computer readable instructions, data structures, program modules and other data for the computer 810. In FIG. 6, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 6 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 6 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system for controlling deployment of computing resources, comprising:

an upgrade controller sensing a resource deployment input indicative of a request to deploy computing resources in a target server farm, and accessing an increment indicator indicative of a fixed increment of the computing resources, that is less than a final resource capacity, to be deployed in the target server farm;

a resource capacity reassignment component removing, in response to a call from the upgrade controller, the fixed increment of computing resources from a source server farm and deploying the fixed increment of computing resources to the target server farm; and a database move component that determines whether the target server farm has deployed adequate resource capacity to service a fixed increment of databases, and, if so, moves the fixed increment of databases from the source server farm to the target server farm, and, if not, waits for the resource capacity reassignment component to reassign additional computing resources from the source server farm to the target server farm.

Example 2 is the computing system of any or all previous examples wherein the computing resources comprise at least one of hardware computing systems and virtual machines implemented by the hardware computing systems.

Example 3 is the computing system of any or all previous examples and further comprising:

a goal processing component that adjusts a number of virtual machines on a given server farm based on a resource capacity goal for the given server farm, and wherein the resource capacity reassignment component removes the fixed increment of computing resources from the source server farm by reducing the resource capacity goal, for the source server farm, by the fixed increment.

Example 4 is the computing system of any or all previous examples wherein the resource capacity reassignment component deploys the fixed increment of computing resources at the target server farm by increasing the resource capacity goal, for the target server farm, by the fixed increment.

Example 5 is the computing system of any or all previous examples wherein the computing resources implement a multi-tenant service on the source server farm and an upgraded multi-tenant service on the target server farm.

Example 6 is the computing system of any or all previous examples and further comprising:

a set of request routers that route service requests for tenants in the source server farm to computing resources in the source server farm, and wherein the upgrade controller identifies, as the fixed increment, a fractional part of the set of request routers.

Example 7 is the computing system of any or all previous examples wherein the upgrade controller identifies the fixed increment, independently of a workload level on the hardware computing devices and virtual machines on the source server farm.

Example 8 is the computing system of any or all previous examples wherein the upgrade controller identifies the fixed increment based on a number of the databases operably coupled to the source server farm.

Example 9 is the computing system of any or all previous examples wherein the upgrade controller identifies the fixed increment as a fixed percent of a final resource capacity of the target server farm.

Example 10 is the computing system of any or all previous examples and further comprising:
a farm creation component that creates the target server farm, with no computing resources assigned, in response to a call from the upgrade controller.

Example 11 is the computing system of any or all previous examples and further comprising:
a farm tear down component that removes a final increment of the computing resources from the source server farm, after a final increment of the databases has been removed from the source server farm.

Example 12 is the computing system of any or all previous examples wherein the source server farm and the target server farm both implement multi-tenant, cloud-based services.

Example 13 is a method, comprising:
sensing a reassignment input to reassign all computing resources from a source server farm to a target server farm;
incrementally reassigning all of the computing resources from the source server farm to the target server farm, in a plurality of fixed increments; and
after reassigning each fixed increment of the computing resources to the target server farm, moving a set of databases, corresponding to a previously reassigned fixed increment of computing resources, from the source server farm to the target server farm, for servicing at the target server farm.

Example 14 is the method of any or all previous examples wherein incrementally reassigning comprises:
identifying the fixed increment;
removing the fixed increment of computing resources from the source server farm; and
adding the fixed increment of computing resources, removed from the source server farm, to the target server farm.

Example 15 is the method of any or all previous examples wherein the source and target server farms vary a level of virtual machine computing resources generated based on a capacity goal, and wherein removing the fixed increment of computing resources from the source server farm comprises lowering the capacity goal for the source server farm by the fixed increment.

Example 16 is the method of any or all previous examples wherein adding the fixed increment of computing resources to the target server farm comprises increasing the capacity goal for the target server farm by the fixed increment.

Example 17 is the method of any or all previous examples and further comprising:
after all databases are moved from the source server farm to the target server farm, removing all remaining computing resources from the source server farm.

Example 18 is the method of any or all previous examples wherein incrementally reassigning comprises:
incrementally reassigning all of the computing resources from the source server farm to the target server farm, in the plurality of fixed increments, independently of a processing load on the source server farm.

Example 19 is a computer readable storage medium that stores computer executable instructions which, when executed by the computer, cause the computer to perform a method, comprising:
sensing a reassignment input to reassign all computing resources from a source server farm to a target server farm;
incrementally reassigning all of the computing resources from the source server farm to the target server farm, in a plurality of fixed increments by removing the fixed increment of computing resources from the source server farm and adding the fixed increment of computing resources, removed from the source server farm, to the target server farm; and
after reassigning each fixed increment of the computing resources to the target server farm, moving a set of databases, corresponding to an immediately previously reassigned fixed increment of computing resources, from the source server farm to the target server farm, for servicing at the target server farm.

Example 20 is the computer readable storage medium of any or all previous examples wherein the source and target server farms vary a level of virtual machine computing resources generated based on a capacity goal, and wherein removing the fixed increment of computing resources from the source server farm comprises lowering the capacity goal for the source server farm by the fixed increment, and wherein adding the fixed increment of computing resources to the target server farm comprises increasing the capacity goal for the target server farm by the fixed increment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system for controlling deployment of computing resources, the computing system comprising:
a processor; and
memory storing instructions executable by the processor, wherein the instructions, when executed by the processor, configure the computing system to provide:
a goal processing component configured to identify a resource capacity goal corresponding to a source server farm;
an upgrade controller configured to:
receive an upgrade request input indicative of a request to deploy computing resources in a target server farm, and
based on an incremental indicator that indicates an increment of the source server farm to be upgraded at a given time, identify a fixed increment of the computing resources to be deployed in the target server farm, wherein the fixed increment of the computing resources is identified independently of a workload level on the source server farm and is less than a final resource capacity of the target server farm;
a resource capacity reassignment component configured to:
in response to a call from the upgrade controller, remove the fixed increment of computing resources from the source server farm, including one or more virtual machines on the source server farm, by reducing the resource capacity goal and deploying the fixed increment of computing resources to the target server farm; and
a database move component configured to:
determine whether the target server farm has deployed adequate resource capacity to service a fixed increment of databases,
if the target server farm has deployed adequate resource capacity to service a fixed increment of databases, move the fixed increment of databases from the source server farm to the target server farm, and if the target server farm has not deployed adequate resource capacity to service a fixed increment of databases, wait for the resource capacity reassignment component to reassign additional computing resources from the source server farm to the target server farm by further reducing the resource capacity goal.

2. The computing system of claim 1, wherein the computing resources comprise at least one of hardware computing systems and virtual machines implemented by the computing system.

3. The computing system of claim 1, wherein the resource capacity reassignment component is configured to deploy the fixed increment of computing resources at the target server farm by increasing a resource capacity goal, for the target server farm, by the fixed increment.

4. The computing system of claim 1, wherein the computing resources implement a multi-tenant service on the source server farm and an upgraded multi-tenant service on the target server farm.

5. The computing system of claim 1, wherein the instructions further configure the computing system to provide:
 a set of request routers configured to route service requests for tenants in the source server farm to computing resources in the source server farm, and
 wherein the upgrade controller is configured to identify, as the fixed increment, a fractional part of the set of request routers.

6. The computing system of claim 1, wherein the upgrade controller is configured to identify the fixed increment of computing resources, to be removed from the source server farm, independently of a processing load on the one or more virtual machines on the source server farm.

7. The computing system of claim 1, wherein the increment of the source server farm is based on a number of the databases operably coupled to the source server farm.

8. The computing system of claim 1, wherein the increment of the source server farm comprises a fixed percent of a final resource capacity of the target server farm.

9. The computing system of claim 1, wherein the instructions further configure the computing system to provide:
 a farm creation component is configured to create the target server farm, with no computing resources assigned, in response to a call from the upgrade controller.

10. The computing system of claim 1, wherein the instructions further configure the computing system to provide:
 a farm tear down component is configured to remove a final increment of the computing resources from the source server farm, after a final increment of the databases has been removed from the source server farm.

11. The computing system of claim 1 wherein the source server farm and the target server farm both implement multi-tenant, cloud-based services.

12. A computer-implemented method, comprising:
 receiving an upgrade request input indicative of a request to deploy computing resources in a target server farm;
 based on an increment indicator that indicates an increment of a source server farm to be upgraded at a given time, identify a fixed increment of the computing resources to be removed from the source server farm and deployed in the target server farm,
 wherein the fixed increment of the computing resources is less than a final resource capacity and is identified independently of a workload level on a source server farm;
 removing the fixed increment of computing resources from the source server farm, including one or more virtual machines on the source server farm, by:
  reducing a resource capacity goal corresponding to the source server farm, and
  deploying the fixed increment of computing resources to the target server farm; and
 based on deploying the fixed increment of computing resources to the target server farm, determining whether the target server farm has deployed adequate resource capacity to service a fixed increment of databases;
 if the target server farm has deployed adequate resource capacity to service the fixed increment of databases, moving the fixed increment of databases from the source server farm to the target server farm, and
 if the target server farm has not deployed adequate resource capacity to service the fixed increment of databases, assigning additional computing resources from the source server farm to the target server farm by further reducing the resource capacity goal.

13. The computer-implemented method of claim 12, wherein the computing resources comprise at least one of hardware computing systems and virtual machines implemented by the computing system.

14. The computer-implemented method of claim 12, further comprising:
 deploying the fixed increment of computing resources at the target server farm by increasing a resource capacity goal, for the target server farm, by the fixed increment.

15. The computer-implemented method of claim 12, further comprising:
 implementing a multi-tenant service on the source server farm; and
 implementing an upgraded multi-tenant service on the target server farm.

16. The computer-implemented method of claim 12, further comprising:
 routing, using a set of request routers, service requests for tenants in the source server farm to computing resources in the source server farm; and
 identifying, as the fixed increment, a fractional part of the set of request routers.

17. The computing system of claim 12, further comprising:
 identifying the fixed increment of the computing resources based on a number of databases operably coupled to the source server farm.

18. The computing system of claim 12, further comprising:
 identifying the fixed increment as a fixed percent of a final resource capacity of the target server farm.

19. The computing system of claim 12, further comprising:
 receiving an indication of a request to generate the target server farm; and
 prior to deploying the fixed increment of computing resources to the target server farm, generating the target server farm.

20. A computing system for controlling deployment of computing resources, the computing system comprising:
 a processor; and
 memory storing instructions executable by the processor, wherein the instructions, when executed by the processor, configure the computing system to provide:

a request router configured to:
  route a service request for a tenant in a source server farm to computing resources in the source server farm;
an upgrade controller configured to:
  receive an upgrade request input indicative of a request to deploy computing resources in a target server farm, and
  based on an incremental indicator that indicates an increment of the source server farm to be upgraded at a given time, identify a fixed increment of the computing resources in the source server farm, as a fractional part of the set of request routers, to be deployed in a target server farm;
a goal processing component configured to;
  identify a resource capacity goal corresponding to the source server farm;
a resource capacity reassignment component configured to:
  release the fixed increment of computing resources from the source server farm, including one or more virtual machines on the source server farm, by reducing the resource capacity goal and deploying the fractional part of the request routers to the target server farm; and
a database move component configured to:
  in response to a determination that the target server farm is deployed inadequate resource capacity to service a fixed increment of databases, provide a call to the resource capacity reassignment component to release an additional fixed increment of computing resources, including an additional fractional part of the request routers, from the source server farm to the target server farm by further reducing the resource capacity goal.

* * * * *